Dec. 13, 1966   S. J. AEBERSOLD   3,290,820
FLORAL ARRANGER
Filed March 2, 1964
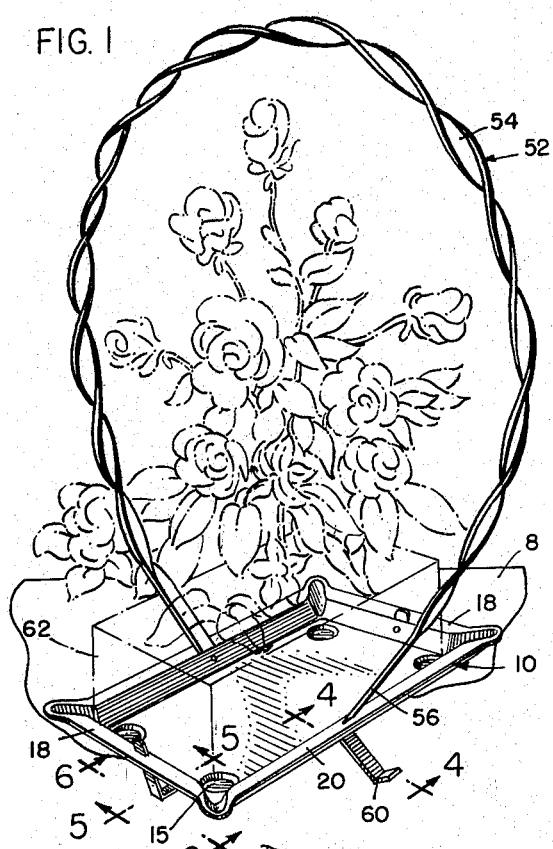
FIG. 1
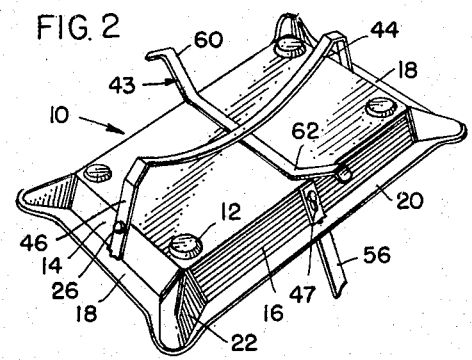
FIG. 2
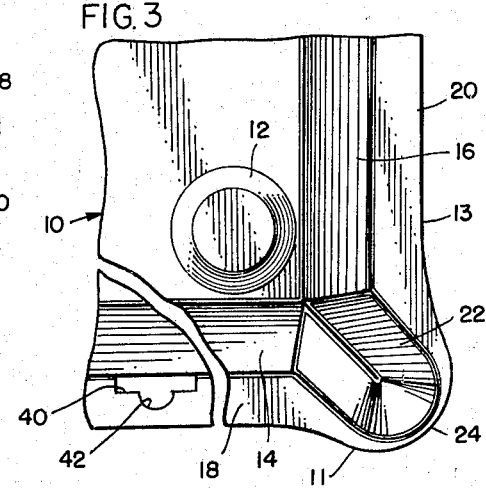
FIG. 3
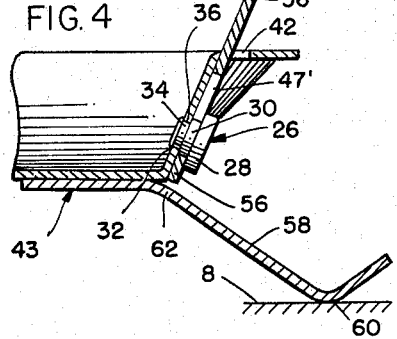
FIG. 4
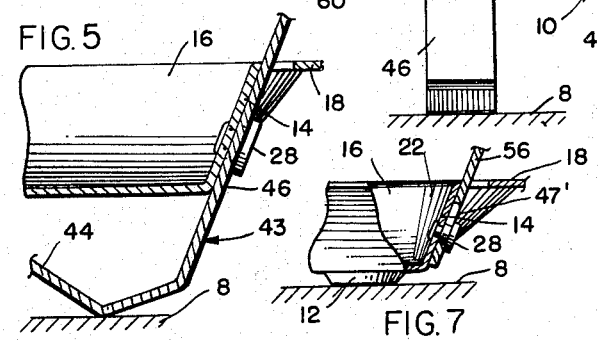
FIG. 5
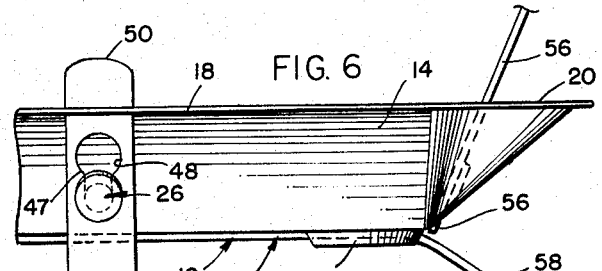
FIG. 6
FIG. 7
INVENTOR:
STANLEY J. AEBERSOLD
BY
ATT'Y

United States Patent Office 3,290,820
Patented Dec. 13, 1966

3,290,820
FLORAL ARRANGER
Stanley J. Aebersold, 1217 Silver St., New Albany, Ind.
Filed Mar. 2, 1964, Ser. No. 348,694
8 Claims. (Cl. 47—41.12)

The present invention relates to floral arrangers and particularly to a durable, inexpensive, portable flower display holder which can be used economically just one time, or repeatedly used or re-adapted for use in various ways for a wide variety of purposes.

Heretofore, inventoring and storing conventional floral arrangers appropriate for various occasions and for various purposes was a financial as well as a space problem for most florists. Moreover, most people are pleased with unostentatious fixtures which are attractive but do not detract from the beauty of flowers and their arrangement. Moreover, many flower holders are unhandy to manage and rather unstable in standing alone or in a group if unwittingly touched or subjected to breezes. Furthermore, knock-down devices are difficult to set up and have no universality and all holders for flowers that are kept fresh for many days require water and very often furniture and floor coverings, etc., become water damaged by overflow or dripping unless great care is taken in locating and handling them.

One of the objects of the present invention is to provide a flower holder element which safely supports a floral arrangement, is easily supplied with water and keeps the flowers well watered whether they be cut flowers or potted flowers.

A further object resides in the universality of floral arrangers embodying the invention for use as a floral basket with a handle or as a stand with wide spread feet and legs, or with both handle and legs, and as an epergne, centerpiece or jardiniere with or without legs or handle.

The invention is characterized by a water holding tray which is easily supplied with water directly without the water contacting the foliage, which prevents overflow surges if momentarily tipped, and which can be made up or re-adapted in any one of a number of ways for different occasions or purposes whether with living or cut flowers.

A further object of the invention is to provide an improved floral arranger which can be inventoried in reduced numbers for miscellaneous uses and easily stored and readily made up for any one of a number of uses.

A still further object is to provide an improved flower holder which will receive a moisture retaining element, either an earth filled pot for living plants or a light plastic foam element receiving cut stems, in supported relationship and properly supplied with water.

A further object is to provide a floral arranger which can support cut flowers on a wall, door or easel with or without moisture supplied thereto.

Another object of the invention is to provide a sturdy, simple, and rugged construction having graceful lines with complete adaptability for various displays, which is inexpensive to manufacture and ship and which can be made up in daily or weekly desired quantities from time to time and readily changed or re-adapted if necessary.

These being among the objects of the invention other and further objects will appear from the description which follows taken in connection with the accompanying drawings, in which:

FIG. 1 is an isometric view of the floral display in which the invention is embodied in all of its elements;

FIG. 2 is an isometric bottom view of the bottom portion of the device shown in FIG. 1;

FIG. 3 is a top plan view of a corner portion of the pan shown in FIGS. 1 and 2;

FIGS. 4, 5 and 6 are sectional views taken on lines 4—4, 5—5, and 6—6 in FIG. 1 respectively; and FIG. 7 is a sectional view showing an alternate location of the bail without the stand portion as a further adaptation of the invention.

Referring now to the drawings in further detail, FIG. 1 shows the invention in its full purport setting on table or floor 8 and in which a pan or tray 10 is shown preferably made from a rectangular blank of sheet metal as punched and drawn by dies with a slight rounding at the corners 11 and set back edges 13 between the corners. It can be made also of vacuum drawn high impact polypropylene, or the like. Metal sheet is described by way of example, but not by way of limitation since the finish color is not involved with the color of the material used.

The pan 10 preferably is rectangular as noted for reasons enabling a wide choice of floral arrangement designs and is provided with offsets 12 on the bottom. These offsets serve as feet on the bottom surface and as shallow water wells 15 on the top surface thereof. The sides of the tray are inclined upwardly and outwardly for nesting and other purposes to form side walls 14 and 16 along the short and long sides of the tray, and these walls terminate in horizontal or coplanar flanges 18 and 20, respectively. The excess stock at the corners left by die drawing the tray is shaped to provide troughs 22 that extend horizontally beyond the sides 14 and 16 and serve both as receivers of water for watering the floral arrangement or as spouts by which excess water that might be present in the pan is poured off without dripping or runback at the lip extremity 24.

At the longitudinal midpoints of the side walls 14 and 16, rivets 26 are secured externally in water sealing relationship in holes 36 provided for their mounting. The rivets as shown in FIG. 4 have a head 28 preferably flat, a shank 30 presenting a shoulder at 32, and a point 34 which is upset to secure the rivet in the holes with the shoulders 32 disposed rigidly against the outside face of the sides. The word rivet as used herein identifies any elements having a like structure notwithstanding its conventional name.

Above the rivets vertically opening slots 40 are provided in the flanges 18 and 20. These slots may be rectangular but preferably have a concave contour at 42 along their outer edge over a portion of the length thereof for the reception of the ends of metal strap elements soon to be described. Although this contour is provided for ease in punching the metal it assists in the ready insertion or reception of the rounded ends of the strap members or the heads of horizontally disposed supporting nails or hooks. When used as a tray without stand or bail, the floral arranger can be used horizontally with or without water as table centerpiece or regular spray and vertically as a standing spray on an easel, a funeral door badge, a door swag or in a wreath.

One size of available stands is shown as attached to the pan. Whether the legs of the stand 43 are short as shown or are longer is optional. All, however, are characterized as shown in that two strips of strap metal are centrally secured together, preferably by welding in a cruciform shape and the ends of the longer legs are bowed downwardly as at 44 and terminally inclined upwardly as at 46 to the shape shown in FIG. 5 in which they follow the outer faces of the short sides in contact therewith. Keyhole slots 47 are provided near their ends as shown in FIG. 6 with the enlarged portion 48 thereof located at the top. Beyond the keyhole slot the ends 46 are rounded at 50 and made long enough to reach or extend through the slots 40 when the enlarged portion 48 is level with the rivet head 26.

Thus, the trays and stands formed as described can be compactly stacked for storage as disassembled items and either the trays used individually or the trays be provided with stands whichever is desired for any particular floral arrangement.

When mounting the stand 43 on the tray 10 the rounded ends 50 are slipped into the slots 40 on the flanges 18 over the flat heads 28 of the rivets under a tension which flattens the bow 44 momentarily due to the leverage exerted by the portions 46 being angled to pass over the top of the head 28 to enter into the slot 40. Then once the heads reach the wide portion of the keyhole slot 47, the head 28 snaps through the slot, the legs recover their original form. Thereafter weight or finger pressure will move the shank 30 of the rivet into the throat of the keyhole slot whereupon the tray with legs rigidly in place is ready for a floral arrangement to be used as a floor piece or table or casket placque. Thus an easily attained interlocking relationship is provided which cannot be dislodged in use but can be easily disengaged at will if and when desired.

A bail element 52 for the floral arrangement is provided for use on the tray if desired and preferably such comprises a straight length of strap metal decoratively twisted intermediate its ends as at 54 for strength and straightness and terminates in ends 56 having like keyhole slots 47 therein. Likewise the enlarged portion thereof is uppermost. However, the element 52 can be short enough to support in place on the tray a flower holder later described for vertical mounting of the tray.

When attaching the element 52 as a bail, the element is flexed with its ends toward each other with the bowed portion up. In doing this, one end 56 of the element is inserted through slot 40 on one of the flanges 20 and the keyhole slot 47 slipped over and into place on the rivet therebelow. The other end of the element 52 is then flexed over and around the tray and inserted in the slot 40 on the other one of the flanges 20 and to snap into place over the rivet head therebelow. The element 52 is thus formed into a bail rigidly fastened to the tray 56.

In this connection reference is made to FIG. 4 where the other element 58 of the cruciform stand is shown shaped to follow along the bottom of the tray until it reaches the side walls. From these they extend downwardly to provide feet 60. It will be observed that at 62 the element 58 is in a position interfering with the downward movement of the lower end of the handle 56. This interference is desirable because insertion of end 56 deflects the element 58 downwardly until the rivet head becomes located in the narrow portion of the slot 47' after which the element 58 drives and holds the end 56 of the bail in its assembled position.

It has been found when handling floral arrangements that downward and a slight twisting of the handle helps settle the legs in a steady position on uneven ground. This would tend to dislodge the bail securement except with the present invention the greater is the downward pressure on the bail, the greater is the upward effort of the legs 58 to hold the bail engagement secure.

It will be appreciated that the bail and tray can be used to make up a regular basket (lengthwise) or a fireside basket (crosswise) without the legs. In these instances the bail can be secured to the ends of the tray (FIG. 7) instead of the sides (FIG. 6) or the bail can be a single bail or an additional cross bail supplementing the first. The endwise bail (FIG. 7), preferably would pass at its top under the top of the sidewise bail since it is foreshortened more by the length of the tray. However, this is not mandatory because the bails can flex where they cross to accommodate either relationship and can be tied together at the crossing if desired.

Reference is again made to FIG. 1 where a flower supporting element 62 is shown in phantom. This element may comprise any one of a number of water absorbent materials such as foamed plastic, expanded polystyrene being an example, a porous ceramic pot or a papier-mache or wood veneer container. The plastic foam is used for cut flowers or artificial flowers with or without water and horizontally or vertically, since the stems can be easily inserted into the material to be supported thereby and absorb water therefrom. The pot or plant container is used for living plants as filled with dirt or other food mixtures and the living plants grown therein or are transplanted thereto.

In any event the shape of the bottom of the element 62 preferably follows the shape of the bottom of the tray and water if used is supplied thereto by pouring same into the tray at any one of the troughs 22 which might be readily accessible, at the time, four being provided so that the floral arrangement need not be moved nor the water poured onto the foliage to splash everywhere and overflow the tray as it drains down. However, if inadvertently too much water is present to be safe, surplus can be poured out merely by tilting the arranger on top of its adjacent legs without it dripping or running down the outside of the tray.

In event there is some question of whether the floral pieces are beginning to dry out, a slight lifting or tilting of the element 62 will expose the wells 12 to view and if they have water in them the plant can be deemed to have been kept watered, but if the wells are dry the plant can be deemed to be in danger. The wells are sufficiently shallow that all water therein would be soaked up if the element covering it was not saturated.

Having thus described the invention, its structural characteristics and their function, it will be apparent how the advantages and stated objects are achieved, and how various and further changes can be made without departing from the spirit of the invention the scope of which is commensurate with the appended claims.

What is claimed is:

1. A floral arrangement device comprising a shallow tray having offsets in the bottom wall defining protuberance on the lower face and shallow wells on the upper face and including upwardly and divergingly inclined side walls terminating in horizontally disposed flanges along its sides and water receiving troughs at the corners, shank headed rivet means secured externally to the side walls below the mid points of said flanges, said flanges having elongated slots therethrough adjacent to the side walls directly above said rivet means, means for supporting said tray including elongated strap members having end portions extending through said elongated slots and having keyhole slots below said slots receiving said shank headed rivet means, said end portions having a normal inclination urging the end portions below the slots against said side walls at said rivet means whereby the keyhole slots are urged into interengagement with said rivet means, the enlarged portion of the keyhole slots being above their narrow portion, and water absorbent means received in said tray for supporting an arrangement of flowers.

2. The combination called for in claim 1 in which said support means comprises a bowed bail strap twisted intermediate its ends and interconnecting rivet means on opposite sides of the tray.

3. The combination called for in claim 1 in which said support means comprises a cruciform of two strap elements one of which has said end portions and is upwardly bowed therebetween for engagement with said bottom wall of the tray, and the other element of which is downwardly turned at its ends to provide feet.

4. The combination called for in claim 3 in which said support means further includes a bowed bail strap twisted intermediate its ends and interconnecting rivet means on opposite sides of the tray, and said other element holds the end portions of said bail strap in said interengagement with the rivet means.

5. A floral arrangement device comprising a tray having upwardly and divergingly inclined side walls terminating in horizontally disposed flanges along its sides, headed means secured externally to the side walls below the mid points of said flanges, said flanges having vertical slots therethrough adjacent to the side walls directly above said means, and means for supporting said tray including an elongated strap member having end portions extending through said vertical slots and having keyholes slots below said vertical slots receiving said headed means, said end portions having an inclination from the vertical in their working position greater than the inclination of the side walls to urge the end portions below the vertical slots against said side walls at said rivets whereby the keyhole slots are urged into interengagement with said headed means, the enlarged portion of the keyhole slots being disposed above the narrow portion thereof.

6. A floral arrangement device comprising a tray having upwardly and divergingly inclined side walls terminating in horizontally disposed flanges along its sides and water receiving troughs at the corners between them, rivet means secured externally to each of the side walls below the mid points of said flanges, said flanges having vertically opening slots therethrough adjacent to the side walls directly above said rivet means and bail means for supporting said tray including an elongated strap having end portions extending through said slots and having keyhole slots below said vertical slots receiving said rivet means, said end portions having a normal inclination in their working position from the vertical comparable to the inclination of the side walls to urge the end portions below the vertical slots against said side walls at said rivet means whereby the keyhole slots are urged into interengagement with said rivet means, the enlarged portion of the keyhole slots being above the narrow portion.

7. A floral arrangement device comprising a tray having upwardly and divergingly inclined side walls terminating in horizontally disposed flanges along its sides and water pouring and receiving troughs at the corners between them, rivet means secured externally to a pair of the side walls below the mid points of said flanges, a pair of opposite flanges having vertically opening slots therethrough adjacent to the pair of side walls directly above said rivets, stand means for supporting said tray including elongated member having end portions extending through said slots and having keyhole slots below said vertical slots receiving said rivet means, said end portions having a normal inclination following the inclination of the side walls to urge the end portions below the vertical slots against said side walls at said rivet means whereby the keyhole slots are urged into interengagement with said rivet means, the enlarged portion of the keyhole slots being above the narrow portion, said member being bowed upwardly and secured to the center of the tray, and an elongated element secured crosswise said member and extending along the bottom of the tray and terminating in outwardly and downwardly inclined legs.

8. A floral arrangement device comprising a tray having a sealed bottom and side walls terminating at the top in horizontally disposed flanges and water receiving troughs at the corners between them, rivet means secured externally to each side wall below the mid points of said flanges, said flanges having elongated slots therethrough adjacent to the side walls directly above said rivet means, means for supporting said tray including elongated bail member and stand elements having end portions extending through said elongated slots and having keyhole slots below said elongated slots receiving said rivet means, said stand elements having resilient portions extending in close proximity to the end portions of said bail member to obstruct disengagement movement of the bail member from said rivet means, the enlarged portion of the keyhole slots being above their narrow portions.

References Cited by the Examiner
UNITED STATES PATENTS

| | | | |
|---|---|---|---|
| 2,521,126 | 9/1950 | Price | 248—152 X |
| 2,597,407 | 5/1952 | Thompson | 224—48 X |
| 2,671,628 | 3/1954 | Everhard | 248—151 |
| 2,774,186 | 12/1956 | Wilkins | 47—41.2 |
| 2,891,354 | 6/1959 | Smithers | 47—41.12 |

ABRAHAM G. STONE, *Primary Examiner.*

J. R. OAKS, *Assistant Examiner.*